United States Patent [19]

Riegel

[11] 4,406,852

[45] Sep. 27, 1983

[54] METHOD FOR FORMING A CONNECTING SLEEVE HAVING AN INTERNAL GROOVE AT THE END SECTION OF A TUBE OF THERMOPLASTIC MATERIAL

[75] Inventor: Karl-Heinz Riegel, Hof, Fed. Rep. of Germany

[73] Assignee: Rehau Plastiks AG & Co., Rehau, Fed. Rep. of Germany

[21] Appl. No.: 332,804

[22] Filed: Dec. 21, 1981

[51] Int. Cl.³ .................................................. B29D 23/00
[52] U.S. Cl. ................................... 264/296; 264/322; 425/DIG. 218
[58] Field of Search ............................. 264/296, 322; 425/DIG. 218, 393

[56] References Cited

U.S. PATENT DOCUMENTS

| | | | |
|---|---|---|---|
| 3,899,565 | 8/1975 | de Putter et al. | 264/296 |
| 4,150,087 | 4/1979 | de Putter et al. | 264/296 |
| 4,279,853 | 7/1981 | Ohta et al. | 264/296 |

FOREIGN PATENT DOCUMENTS

| | | | |
|---|---|---|---|
| 53-269 | 1/1978 | Japan | 264/322 |
| 53-136076 | 11/1978 | Japan | 264/296 |

*Primary Examiner*—James B. Lowe
*Attorney, Agent, or Firm*—Spencer, Kaye & Frank

[57] ABSTRACT

A method for forming a connecting sleeve having an internal groove at the end section of a tube made of crystalline or partially crystalline thermoplastic material in which the end section is heated to the deformation temperature and then is axially upset in a heatable device which defines an annular gap until the annular gap is filled. This increases the wall thickness of said end section, which is then shaped to form the connecting sleeve during axial displacement in a mold. The end section is heated to a processing temperature within the range of the deformation temperature and up to the crystalline melting temperature. In the initial step in the heatable device the application of the first axial upsetting force is such that the upsetting begins at the front end of the end section and continues until the annular gap in the heatable device is filled.

4 Claims, 5 Drawing Figures

METHOD FOR FORMING A CONNECTING SLEEVE HAVING AN INTERNAL GROOVE AT THE END SECTION OF A TUBE OF THERMOPLASTIC MATERIAL

BACKGROUND OF THE INVENTION

The present invention relates to a method for forming a connecting sleeve having an internal groove at the end section of a tube of thermoplastic material in which the end section is heated to the deformation temperature, is then, in order to increase its wall thickness, axially compressed or upset in a heatable upsetting device which defines an annular gap until the annular gap is filled, is thereafter shaped to form the connecting sleeve while being axially displaced in a mold, and is finally cooled.

Method and apparatus for implementing such sleeve forming operations are known in the art. Reference is made, for example, to German Pat. No. 1,257,413, which discloses an apparatus for providing hollow plastic bodies with sleeve ends, annular grooves and thickened walls. The tube ends worked with this apparatus are preheated for deformation, for example, in so-called annular gap furnaces (annular heating devices) and are then given their final shaping in a molding device. During this final shaping, an upsetting force may be applied which compensates for the weakened wall portions developed during the shaping by pushing in heated tube wall material until the original wall thickness is regained. See also, U.S. Pat. Nos. 3,553,780 and 3,557,278.

German Auslegeschrift No. 2,319,398 and corresponding U.S. Pat. No. 3,899,565 further disclose a method, as well as an apparatus containing an inner mandrel and a hollow outer mold which define an annular gap, for forming a sleeve having an annular groove at the end section of the tube of thermoplastic material, wherein a thickening of the end section takes place in the form of preliminary upsetting at a temperature above the softening (deformation) temperature. Preliminary upsetting of the end section is here progressive from a region remote from the frontal face of the end section of the tube toward the frontal face. The preliminary upsetting process is continued until the annular gap existing between the inner mandrel and the outer mold has been filled with the softened plastic material of the tube wall and of the thickened wall in this region. The filling of the annular gap takes place from the entrance opening of the mold, that is, where the tube end section enters the mold, toward the bottom of the annular gap in the interior of the mold.

After the preliminary upsetting in the prior art process disclosed in German Auslegeschrift No. 2,319,398 and the corresponding U.S. Pat. No. 3,899,565, the sleeve is formed by displacing the upset end section onto a widened section of the mandrel which is at a lower temperature than the deformation temperature of the plastic material and which acts as a sleeve forming device. This produces a certain stabilization of the peripheral regions of the sleeve surface already during the sleeve forming process, which stabilization is reinforced by the fact that the inner wall of the outer mold is also kept at a temperature below the deformation temperature of the plastic during the sleeve forming process.

An annular inner (peripheral) groove is then formed in the sleeve by pressing a spreading element of the sleeve forming device into the end section with its partially stabilized sleeve. For this purpose, the sleeve forming device is provided with a groove-forming member in the form of a rubber body which can be pressed from the inner side of the mandrel by a cone shaped expanding part.

In the known process disclosed in German Auslegeschrift No. 2,319,398 and the corresponding U.S. Pat. No. 3,899,565, the shaping of the connecting sleeve from the thickened upset end section is thus performed by axial displacement of the end section on the widened portion of the inner mandrel and subsequent pressing to form the annular circumferential groove by means of known spreading members. It is here important that the thickening process, as well as the subsequent shaping process for forming the connecting sleeve, are performed by axial and radial displacement in one and the same apparatus. The thickening of the wall must be completed before the shaping process for forming the connecting sleeve begins. During the sleeve shaping process itself—as a result of the thickening tube end being pushed onto the widened portion of the inner mandrel—there may occur a solidification of the sleeve walls, but pressing in the sleeve to form the annular goove further weakens the wall cross section in the sleeve region without this drawback being able to be overcome by further upsetting.

Finally, German Offenlegungsschrift No. 2,805,518 discloses an apparatus for shaping seal receptacles in sleeve connections for plastic tubes. This publication discusses the problems encountered in fixing fit dimensions in the interior of the sleeve and, in particular, for the sleeve member which is to receive the seal. In addition to a special configuration of the mold ring for producing the annular groove, this publication neither makes particular mention of the problem of preliminary upsetting nor of any possible difficulties encountered in the shaping of the cylindrical sleeve portion.

The processes and apparatus known in the art are able to handle without difficulty tubes of plastic materials having an amorphous structure, such as, for example hard PVC, since these plastics have the property of softening in a temperature range between 90° and 140° C. and can be easily worked continuously while the temperature is increasing with a uniformly progressive heat supply. Between the stated temperature regions, the material is thermoplastic and forces for its deformation are dependent on the respective temperature of the tube.

The prior art methods and apparatus, however, are unable to correspondingly change the shape of tubes made of crystalline or partially crystalline thermoplastic materials such as polyethelene, polypropylene, and the like.

The crystalline components of these materials are converted to the amorphous or partially amorphous state by heating, and this conversion results in an increase in volume, i.e. swelling of the material. Maximum swelling is realized when the crystalline melting temperature is reached or exceeded. Problems encountered during heating of tubes made of crystalline or partially crystalline plastics arise, for example, because the reduction of the crystalline components may be nonuniform over the cross section of the tube due to differences in tube wall thickness and due to the manner of heating of the tube. This produces irregular swelling which is further promoted by the release of internal stresses in the tube. The crystalline or partially crystalline thermoplastic materials, in contrast to the amorphous plastics, exhibit no continuous softening curves during heating, so that irregular swellings result in the radial and axial directions of the tube end section. Such swollen tube ends are useless for further processing.

Although U.S. Pat. No. 3,899,565 discloses heating and upsetting of a tube made of a crystalline plastic, e.g. polyethylene, beginning in the region of the end section, the upsetting is done in one process step, and the subsequent shaping of the sleeve and of the circumferential groove weakens the upset tube wall material again in these regions, so that, particularly in the susceptible region of the circumferential groove, the widening of the circumference of the end section as a result of the sleeve shaping results in a considerable weakening of the tube end section walls which may easily lead to a break in this region of the tube which is particularly heavily stressed.

SUMMARY OF THE PRESENT INVENTION

It is an object of the present invention to provide a method with which tubes made of thermoplastic material of a crystalline or partially crystalline structure can be provided with a sleeve and a circumferential groove without the above-described special conditions during processing of such materials and without any disadvantageous effects.

Another object of the present invention is to provide a method which produces an accurately shaped tube end that can be subsequently formed into a sleeve.

Additional objects and advantages of the present invention will be set forth in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a method for forming a connecting sleeve having an internal groove at the end section of a tube made of crystalline or partially crystalline thermoplastic material in which the end section, which has a free frontal end, is heated to the deformation temperature, is then axially preliminary upset in a heatable upsetting device which defines an annular gap until the annular gap is filled, thus increasing the wall thickness of the end section, and is then shaped to form the connecting sleeve during axial displacement in a molding device and is finally cooled, comprising:

(1) heating the end section to a processing temperature within the range of the deformation temperature, which is relatively narrow, and up to almost the crystalline melting temperature of the thermoplastic material, and when the end section reaches the processing temperature, preliminary upsetting the end section in the preliminary upsetting device by the application of a first axial upsetting force so that the preliminary upsetting begins in the free frontal end of the end section and continues until the annular gap in the preliminary upsetting device is filled, (2) removing the heated and preliminary upset end section from the preliminary upsetting device, and (3) bringing the so removed end section immediately to a final shaping device, and applying an axial upsetting force in the final shaping device to form the connecting sleeve while maintaining the temperature of the tube end at the processing temperature.

It is to be understood that both the foregoing general description and the following detailed description are exemplary, but are not restrictive of the invention.

DETAILED DESCRIPTION OF THE INVENTION

Figure 1:
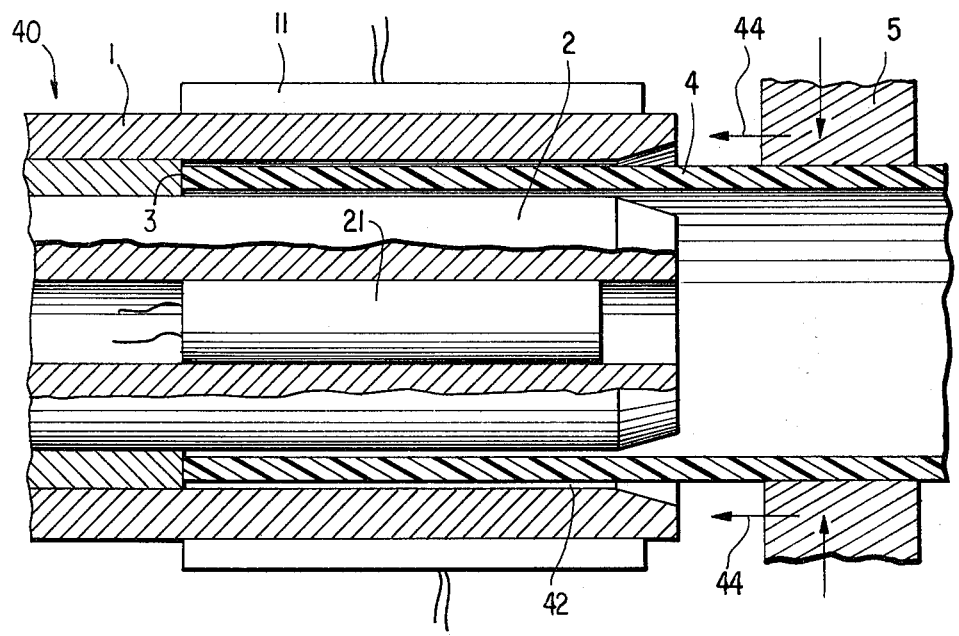
FIG. 1 is a cross sectional view of an annular heating device in which the preliminary upsetting of the process of the present invention can be performed, and showing a tube inserted into the device before upsetting begins.

The process according to the present invention takes place in two successive process steps, namely, (1) bringing the tube end to the deformation temperature with simultaneous thickening of the wall of the tube end by preliminary upsetting when the tube end reaches the deformation temperature, and (2) subsequently thereto, forming the sleeve and the circumferential groove with the aid of the final upsetting process.

The heating of the tube end to its deformation temperature takes place in a known annular heating device which is delimited on three sides and which is provided, according to the present invention, with an upsetting device. The annular heatable upsetting device generally comprises an outer mold and an inner mandrel which define an annular gap. In the process of the present invention, the end section preferably is uniformly heated up to almost the crystalline melting temperature of the thermoplastic material. During heating to the deformation temperature, care must be taken that the amount of crystallite component of the materials employed is reduced as much as possible by the input of heat, without, however, completely bringing about a complete reduction in the amount of crystallite component. The crystallites are reduced in amount by melting which is caused only by the application of heat, and if there was a complete reduction in the amount of crystallite component, the material would then convert to the liquid state and could not be upset and processed. Thus, in the practice of the present invention, care is taken to bring the end section to a temperature within the deformation range and up to almost the crystallite melting temperature.

As used herein, the deformation temperature refers to a temperature at which crystallites melt, and the deformation temperature range begins at the first temperature at which the crystallites begin to melt. For example, for a polyethylene which has, for example, a crystallite melting temperature of 124° C., crystallites being to melt at about 120° C., and the preliminary upsetting of the present invention must take place between this 120° C. temperature and a temperature up to almost the crystallite melting temperature of 124° C. The reduction in the amount of crystallites by means of temperature is not related to the softening of the material which occurs at increasing temperature. For example, hard polyethylene, when heated to above room temperature, will become softer and softer, which is the result of the melting of the amorphous zones within the material, and not the result of the melting of crystallites.

By reducing the amount of crystallite component of the crystalline and partially crystalline materials processed in the present invention, the material to be processed becomes softer and can thus be worked more easily. This manner of proceeding is advantageous because a constant amount of crystallite component sets itself in the material at every tube temperature realized below the crystallite melting point, and this amount of crystallite component remains constant as long as the respective temperature is maintained, i.e. will not change if the heating period is extended. In the practice of the present invention, the temperature at which preliminary upsetting is performed generally is a single set temperature, and preferably this temperature is maintained at a tolerance of ±1° C.

In contrast to processes which produce an irregular swelling in crystalline or partially crystalline thermoplastics, the process according to the present invention provides a process sequence which produces, even with the use of crystalline or partially crystalline thermoplastics, a tube end which, after having been brought to the deformation temperature, enters the final shaping for forming stage for forming the sleeve with defined dimensions and diameter characteristics.

In the first process step according to the present invention, the temperature caused reduction of the crystallites, the resulting swelling process in the tube wall, and the simultaneously attacking first upsetting force produce a complete filling of the entire annular gap cross section of the annular heating device, so that an accurately shaped tube end is available for the subsequent deformation process during which the sleeve is formed. The temperature caused swelling of the tube wall in the annular gap cross section of the heating device and the upsetting advance also improve the contact between the outer and inner walls of the tube and the heating surfaces of the annular heating device so that contact on all sides results in very uniform heating of the entire tube wall cross section continuously until the heating process is completed. In this way, a very uniform residual crystallinity can be realized in the tube wall cross section which is of particular significance for uniform shaping of the final outlines of the sleeve and circumferential groove at the tube end.

The selection of the correct heating temperature to near but closely below the crystallite melting temperature of the crystalline or partially crystalline material employed, in combination with the mechanical upsetting in the optimum temperature range, substantially reduces the stresses existing in the tube end so that the heated, thickened tube end, after removal from the annular heating device, remains sufficiently form-stable until it is introduced into the final shaping device where the sleeve is formed.

As has already been pointed out, according to the present invention, the preliminary shaping of the material in the heating device and the final shaping in the sleeve forming station take place in the vicinity of the crystallite melting temperature of the material employed. For hard polyethylene, for example, the preferred temperature lies at 130° C. Hard polyethylene, however, depending on the type of material employed, has a different crystallite melting temperature between 124° and 133° C. It is important for the process according to the present invention that the processing temperature is set shortly below the respective crystallite melting temperature.

For polypropylene, the crystallite melting temperature, depending on the type of material employed, lies between 160° and 165° C. For polybutene, the crystallite melting temperature is lower than for hard polyethylene, i.e. below 124° C. In the implementation of the process according to the present invention, it must be noted that the temperature range for the thermal deformability of crystalline or partially crystalline materials is relatively narrow compared to that for amorphous material, such as hard PVC. Experience has shown that the temperature range for the thermal deformability of crystallite or partially crystalline materials has a band width of about 5° C., and that this band width is available for the preliminary upsetting process. This requires optimum adjustability of the annular heating device. This limitation also indicates that during the heating of crystalline or partially crystalline materials, the upper limit for the heating device temperature during the preliminary upsetting must not be selected to be substantially higher than the desired tube temperature for the subsequent sleeve shaping process—as this would be possible, for example, for hard PVC—since otherwise there would occur too extensive a drop in the crystallite reduction between the inner and outer circumferential faces of the tube and the core of the tube wall. In such a case, the external circumferential faces of the tube wall, which are in more or less direct contact with the surfaces of the heating device, would become plastic too quickly which would result in shifts of surface regions with respect to the internal regions of the tube walls and thus would produce strength losses in the sleeve region.

To implement the first process step of the present invention, it is therefore necesssary to carefully match the temperature curve during heating with the use and application of force for the preliminary upsetting process. In the process of the present invention, the tube end inserted into the annular gap of the heating device, at the above-mentioned temperature, begins to swell beginning at the frontal face of the tube end due to the action of the heat, and this causes the tube end to continuously place itself against the inner mandrel core of the heating device and the outer mold of the heating device, beginning with the frontal face of the tube end and continuing in the direction toward the entrance end of the mold.

The matching can be achieved by setting the temperature of the heating device with due regard to the crystallite melting temperature of the plastic material and carefully maintaining it at this temperature with a tolerance of ±1° C. The mandrel can be heated by a normal cartridge heater, and the outer mold by heating collars, as in U.S. Pat. No. 3,899,565. The setting of the temperature can be achieved using a normal thermocouple in both the outer mold and the mandrel, where these thermocouples are connected to a precision regulator, of the type marketed by Phillips under the brand-name "Plastomatic II".

The required upsetting force for the preliminary upsetting process is achieved using a clamping device to clamp the tube in a cold spot outside the heating device and pushing it into the annular gap of the heating device by way of a pneumatic cylinder mounted on the clamping device. The required upsetting force is calculated from the piston area of the pneumatic cylinder and the existing air pressure.

The required heat for upsetting is developed in the tube wall cross-section as follows: after the tube end has been pushed into the annular gap of the heating device, heat is brought to the free tube end from three sides, namely from the heated mandrel, from the heated outer mold and from the frontal face of the heating apparatus, which can also be termed the limit of the pushing in of the tube. The three-sided heating of the tube end at the frontal face leads to the beginning of crystallite degradation and thus to the softening of the tube end to deformation temperature. The tube is now softened beginning at the frontal face, and through the constant upsetting force of the pneumatic cylinder is pushed, with increasing softness, into the annular gap of the heating device. This brings the tube, starting from the frontal face which has been pushed in, and continuing along the length of the annular gap of the heating device, from its original thickness to a greater wall thickness corresponding to the thickness of the annular gap.

The measured advancing force of the upsetting process has the result that the annular gap of the heating device, under continued heating of the tube end, fills itself with the tube wall material from the inside of the mold toward the outside of the mold. This filling process produces a compensation for the longitudinal shrinkage which occurs during heating, as well as a cancellation of the uncontrolled swelling of the tube wall material. At the end of the heating process, the tube end lies in the annular gap of the heating device at a continuous temperature below the crystallite melting temperature, and the swelling during heating, in combination with the upsetting force, causes the internal and external circumferential faces of the tube end to contact the circumference of the inner mandrel of the heating device as well as the interior circumference of the outer mold. It is self-evident that the mandrel as well as the outer mold of the heating device must have the same temperature which is required to transmit the optimum deformation temperature to the tube end.

By filling the annular gap of the heating device with the tube wall material, there results a definable thickening of the initial wall thickness of the tube, since the inner dimensions of the annular gap must be at least slightly above the cross-sectional surface of the tube to make it possible to easily push the tube end into the annular gap.

By way of example, for a tube of an outside diameter of 110 mm, the inital wall thickness of the tube was 10 mm. During the preliminary upsetting process, this cross section was increased, due to the design of the annular gap in the heating device to 12.5 mm. The preliminary upsetting according to the present invention effected not only such an increase in the wall thickness, but simultaneously it also maintained the position required for the sleeve forming process in the heated zone of the tube end with a continuous increase in wall thickness on all sides in the stated order of magnitude.

The heated preliminarily upset tube end which, in the case of the present example, was at a temperature around 130° C., was then removed from the annular heating device in such a manner that neither its outlines nor the resulting thickened walls were adversely affected. Immediately thereafter, the tube end was introduced into a sleeve forming upsetting device which includes a mold, as disclosed, for example, in German Pat. No. 1,257,413, and U.S. Pat. Nos. 3,553,780 and 3,557,278. It is very important that this sleeve forming upsetting device is heated to the same temperature as the heated tube end, so as to avoid quenching of the heated tube circumference and thus an undesirable solidification of external wall regions of the tube.

Once the heated tube end has been given its final shape by the heated sleeve forming device, in which under the attack of the second upsetting force the sleeve and its circumferential groove are formed, the finally upset tube end is removed by opening the mold and taking the shaped sleeve from the mandrel. Before the mold is opened, an indirect cooling process may start already by charging the heating channels of the mold with a coolant so as to cool the surfaces of the finally upset sleeve. This cooling process should advantageously be continued until the cooled inner and outer skin in the heated sleeve region are thick enough to keep the sleeve form-stable during removal from the mandrel.

Immediately after removing the tube end with the shaped sleeve, direct subsequent cooling is recommended, for example, by spraying coolant onto the heated internal and external circumferential faces of the tube end. Such a cooling prevents heat from the center region of the tube wall from reheating the cooled end zone which would cause the heated end region of the tube to shrink back again.

As will be understood, the sleeve forming device brings about a widening of the tube end. The end section is upset in the mold of the sleeve forming device in order to compensate for losses in wall thickness which occur during widening.

Referring now to the drawings, FIG. 1 shows an annular heating device in the form of gap furnace 40 which comprises a furnace core or mandrel 2 and an outer mold in the form of a furnace jacket 1 which is spaced from and surrounds furnace core 2. An annular abutment 3 is in contact with and positioned between furnace core 2 and furnace jacket 1. Abutment 3 serves as the frontal face of annular gap furnace 40, and together with furnace core 2 and furnace jacket 1 define an annular gap 42. Furnace core 2 is heatable by means of a heating cartridge 21, whereas furnace jacket 1 is heatable by means of a heating sleeve 11. Both heating arrangements can be regulated to the required processing temperature by means of appropriatte control elements.

In the practice of the present invention, a tube 4 made of crystalline or partially crystalline material, such as polyethylene, is heated in annular gap furnace 40. Polyethylene tube 4 is first pushed into furnace 40 up to abutment 3. In this position, as seen in FIG. 1, there is an air layer between the inner circumferential tube face of tube 4 and furnace core 2 and an air layer between the outer circumferential tube face of tube 4 and furnace jacket 1.

Figure 2:
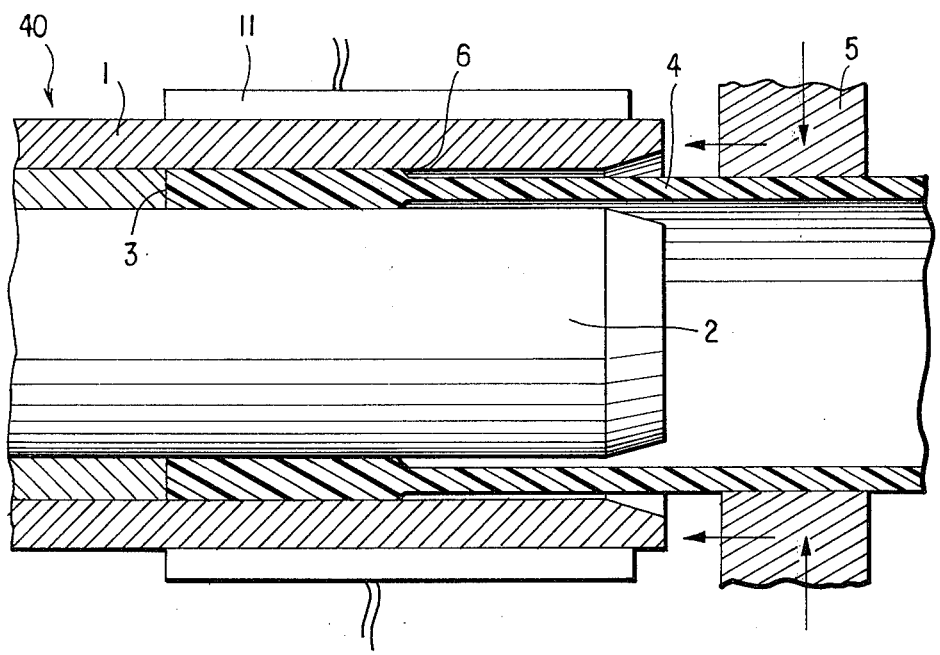
FIG. 2 is a cross-sectional view showing the device of FIG. 1, and showing the tube in a mid-position achieved during the preliminary upsetting.

Tube 4, as shown in FIG. 2, is held firmly externally of furnace 40 in a cold tube zone by means of a clamping device 5. Clamping device 5 also serves for applying the pressure to tube 4 necessary for the upsetting. The abutment 3 and the entire furnace 40 are stationary. Clamping device 5 is moved axially in the direction of the arrows 44 towards the furnace 40 and presses the end face of the tube 4 increasingly against abutment 3, which results in the progressive filling of gap 42.

As shown in FIG. 2, the progressing filling of gap 42 in furnace 40 occurs from left to right, with the position 6 indicating approximately the mid-position of the displacement process. In FIG. 2, clamping device 5 has been clearly displaced towards the left as compared to its position shown in FIG. 1.

Figure 3:
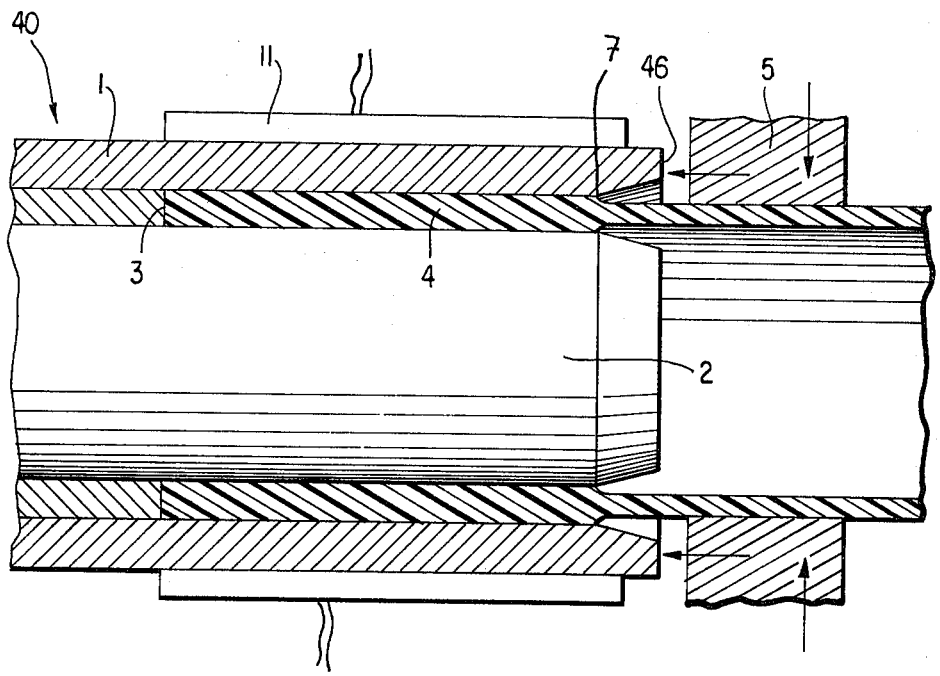
FIG. 3 is a cross-sectional view showing the device of FIG. 1, and showing the tube in a final position achieved during the preliminary upsetting.

As shown in FIG. 3, clamping device 5 has been advanced approximately to the end face 46 of furnace 40 and the filling process of the annular gap 42 in furnace 40 is completed at position 7.

With the above, the heating and preliminary upsetting process of the polyethylene tube in annular gap furnace 40 has been completed. The filling of annular gap 42 has occurred according to the present invention from the left toward the right, that is, it begins with the free frontal end of tube 4 and continues until the annular gap 42 is filled. The heat-up of the tube wall material of tube 4 simultaneously occurs from the left towards the right such that the hottest tube portion is always in the left-hand zone, whereas the colder tube portions, continuously also heated by the upsetting pressure of the clamping device from the left to the right, are upset and progressively engage the walls of the annular gap.

Figure 4:
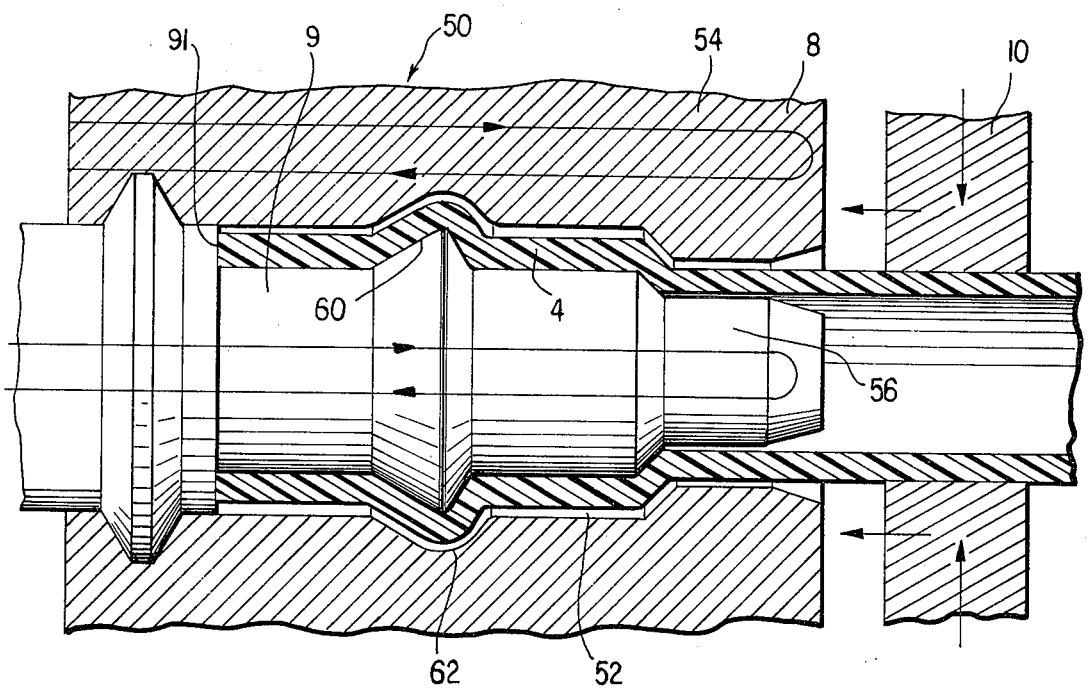
FIG. 4 is a cross-sectional view of a final shaping device in which the preliminary upset tube is subjected to an axial upsetting to form the connecting sleeve in accordance with the process of the present invention and showing the tube before the axial upsetting.
Figure 5:
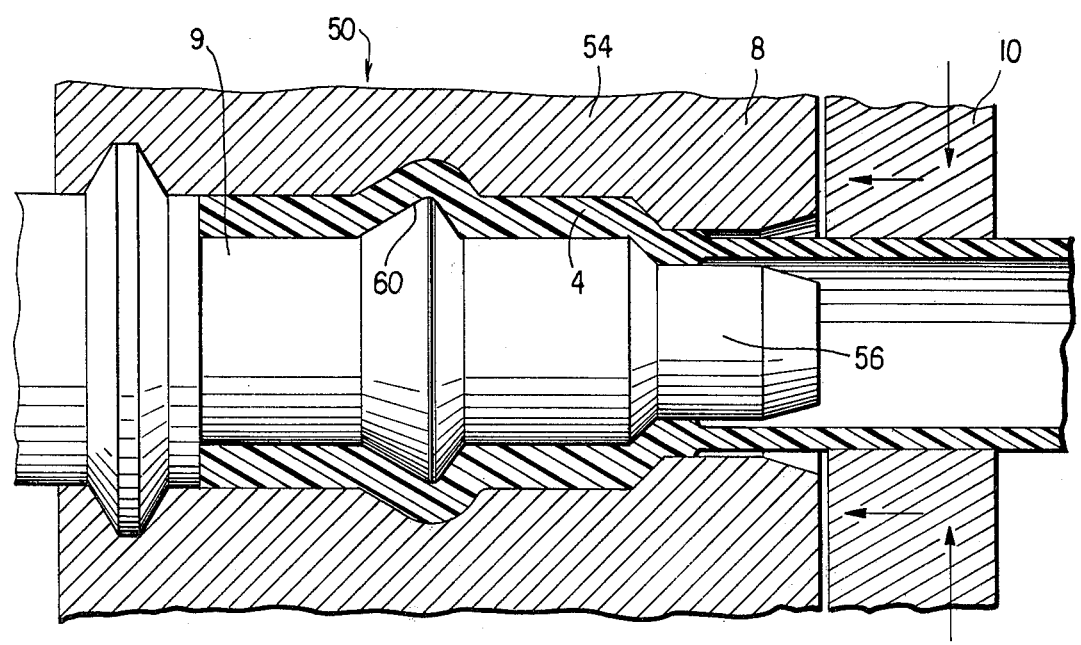
FIG. 5 is a cross-sectional view of the final shaping device of FIG. 5, and showing the tube after the axial upsetting.

In FIGS. 4 and 5 there is schematically shown the forming process proper of the connecting sleeve and internal groove, otherwise known as a collar or socket.

Tube 4 after completion of the preliminary upsetting is removed from furnace 40 and introduced into a final shaping device in the form of a sleeve working tool 50 which comprises a sleeve mandrel 9 and an outer form 8, as shown in FIG. 4. The front portion 54 of outer form 8 is spaced from the front portion 56 of sleeve mandrel 9, to define an annular gap which is terminated by an abutment 91 on sleeve mandrel 9. Both outer form 8 and sleeve mandrel 9 are structured to be heatable and coolable. The heating and cooling arrangements are designated by oppositely oriented arrows in sleeve mandrel 9 and outer form 8. Liquid heating and cooling media can be utilized in a conventional manner. The heating, however, may be effected electrically, whereas the cooling is performed by a liquid coolant.

Sleeve mandrel 9 contains a shoulder 60 which is positioned opposite a recess 62 in outer form 8. Shoulder 50 and recess 62 serve to form an annular groove in tube 4.

The upsetting process in sleeve working tool 50 progresses as follows:

The heated and preliminary upset tube end is removed from annular gap furnace 40 and introduced into the sleeve tool 50 proper, as shown in FIG. 4. The pressure required for the introduction is applied by a clamping device 10 which engages the tube wall in its cold zone. Even for the introduction into the sleeve tool 50, there is required a certain pressure since the heated and preliminary upset tube wall material has to overcome the contours of sleeve mandrel 9. This first part of the inserting process terminates when the tube wall material has, with its end face, reached abutment 91 of sleeve mandrel 9.

From FIG. 4 it is apparent that the tube wall material does not fully fill the annular gap between outer form 8 and sleeve mandrel 9, but there remains towards the outer form a throughgoing air gap 52 whereas, because of the inserting operation being performed, the tube wall material engages the contour of sleeve mandrel 9. The wall thickness of the preheated tube end achieved by the preliminary upsetting is reduced by virtue of the insertion onto sleeve mandrel 9, as determined by the increases in diameter in the sleeve zone and internal groove zone of tube 4. This reduction in the wall thickness is compensated as soon as the inserting process, as shown in FIG. 5, takes place by means of an additional displacement of the clamping device 10 towards sleeve work tool 50. By means of this displacement, the annular gap 52 of the sleeve tool 50 is fully filled with the tube wall material between sleeve mandrel 9 and the outer form 9.

After filling of the annular gap according to FIG. 5, the post upsetting process is terminated and the heating in sleeve mandrel 9 and in outer form 8 is switched to cooling. At the end of the cooling period, outer form 8 is opened. Sleeve mandrel 9, which is formed of individual segments, is folded together and the tube end with the completed sleeve is removed from tool 50.

It will be understood that the above description of the present invention is susceptible to various modifications, changes and adaptations, and the same are intended to be comprehended within the meaning and range of equivalents of the appended claims.

What is claimed is:

1. A method for forming a connecting sleeve having an internal groove at the end section of a tube made of crystalline or partially crystalline thermoplastic material in which the end section, which has a free frontal end, is heated to the deformation temperature, is then axially preliminary upset in a heatable upsetting device which defines an annular gap until the annular gap is filled, thus increasing the wall thickness of said end section, and is then shaped to form the connecting sleeve during axial displacement in a molding device and is finally cooled, comprising:

(1) heating the end section to a a processing temperature within the range of the deformation temperature, which is relatively narrow, and up to almost the crystalline melting temperature of the thermoplastic material, and when the end section reaches the processing temperature, preliminary upsetting the end section in the preliminary upsetting device by the application of a first axial upsetting force so that the preliminary upsetting begins in the free frontal end of the end section and continues until the annular gap in the preliminary upsetting device is filled, (2) removing the heated and preliminary upset end section from the preliminary upsetting device, and (3) bringing the so removed end section immediately to a final shaping device, and applying an axial upsetting force in the final shaping device to form the connecting sleeve while maintaining the temperature of the tube end at the processing temperature.

2. The method as defined in claim 1, wherein the temperature at which preliminary upsetting is performed is a single set temperature.

3. The method as defined in claim 1, wherein the end section is heated to a temperature which is within about 5° C. of the crystalline melting temperature.

4. The method as defined in claim 1, wherein the temperature at which preliminary upsetting is performed is a single set temperature which is maintained at a tolerance of ±1° C.

* * * * *